(No Model.) 2 Sheets—Sheet 1.
J. FERNIE.
APPARATUS FOR VENTILATING APARTMENTS.
No. 280,595. Patented July 3, 1883.
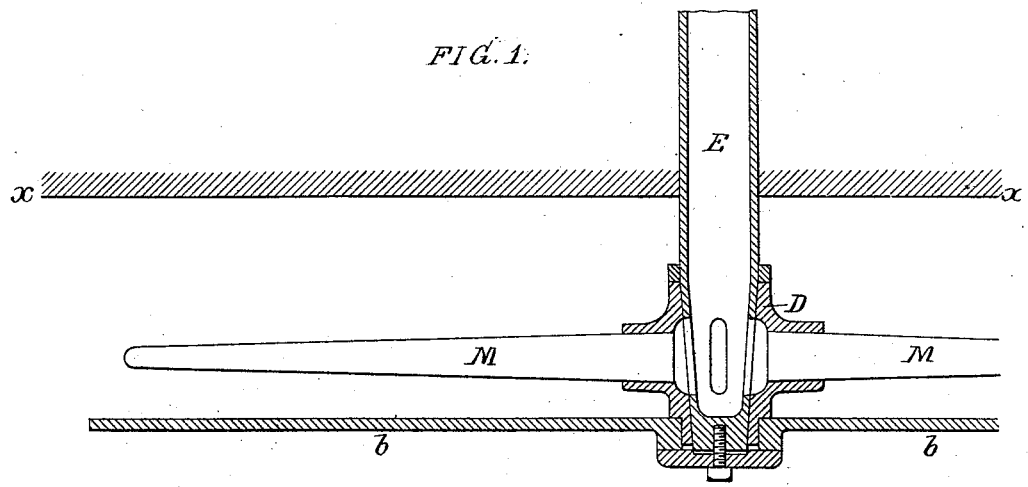
FIG. 1.
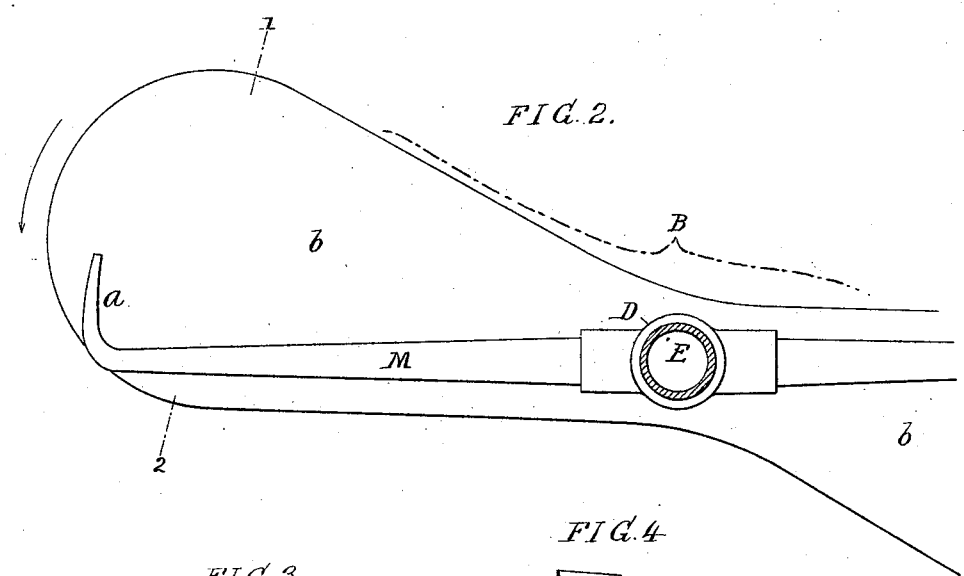
FIG. 2.
FIG. 3.
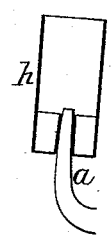
FIG. 4.
FIG. 5.
WITNESSES:
Harry Drury
Hamilton D. Turner
INVENTOR:
John Fernie
by his Attorneys
Howson and Son (No Model.) 2 Sheets—Sheet 2.

J. FERNIE.
APPARATUS FOR VENTILATING APARTMENTS.

No. 280,595. Patented July 3, 1883.

WITNESSES:
Harry Drury
Hamilton D. Turner

INVENTOR
John Fernie
by his Attorneys
Howson and Sons

UNITED STATES PATENT OFFICE.

JOHN FERNIE, OF PHILADELPHIA, PENNSYLVANIA.

APPARATUS FOR VENTILATING APARTMENTS.

SPECIFICATION forming part of Letters Patent No. 280,595, dated July 3, 1883.

Application filed February 23, 1883. (No model.)

*To all whom it may concern:*

Be it known that I, JOHN FERNIE, a subject of the Queen of Great Britain and Ireland, and a resident of Philadelphia, Pennsylvania, have invented certain Improvements in the Mode of and Apparatus for Ventilating, of which the following is a specification.

My invention consists, mainly, in ventilating apartments, and especially basement and other close rooms in stores or factories, by introducing into the same, preferably near the ceiling, whirling jets of fresh air under pressure, in the manner described hereinafter, the object being the thorough dissemination of fresh air throughout an apartment and the thorough agitation of any foul air therein.

My invention further consists of certain mechanism for carrying the main feature of my invention into effect.

Figure 6:
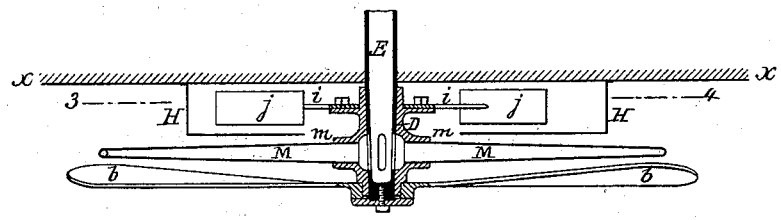

In the accompanying drawings, Figure 1, Sheet 1, is a vertical section of my improved ventilating device; Fig. 2, a plan view, partly in section; Fig. 3, a section on the line 1 2, Fig. 2, showing the inclination of the blades of the fan; Figs. 4 and 5, views indicating an addition which may be made to part of the device; Fig. 6, Sheet 2, a view showing an exhaust-fan combined with the ventilating device, and Fig. 7 a sectional plan of Fig. 6 on the line 3 4.

The reaction-wheel, by which whirling jets of fresh air are produced, consists in the present instance of two tubular arms radiating in contrary directions from a central hub or casing, D, which is so fitted to the lower end of a pipe, E, as to revolve freely thereon, the pipe communicating with a fan or other blowing mechanism, by which fresh air can be continuously forced through the said pipe. Each tube terminates in a tangentially-arranged nozzle, *a*, which I prefer to bend slightly downward. There are many differently-constructed wheels, which depend for their rotation on the tangential issuing of gases or fluids under pressure from orifices, and which may be substituted for that illustrated; but I prefer the latter on account of its simplicity. This reaction-wheel will generally be situated near the ceiling, (indicated by the line *x* in Fig. 1,) and when rapidly rotated whirling jets of fresh air will be discharged into the apartment, and, mixing with and agitating the foul air, will render the latter innocuous. As the jets whirl, there will be a much more thorough dissemination of air and much more thorough disturbance of the foul air than if the jets emanated from fixed orifices.

I prefer to combine with the reaction-wheel a fan, B, which has in the present instance two blades, *b*, inclined to about the extent indicated by the transverse section, Fig. 3, so that the agitated air may take a downward course. The two blades may be made in one piece secured to the lower end of the central hub or casing, D, as shown in the drawings; or they may be attached directly to the tubular arms of the reaction-wheel. As this wheel and fan revolve, there must be a constant supply of fresh air emanating in whirling jets from the wheel at the point where the fresh air is most needed— that is, near the ceiling. At the same time, the fan agitates the air and causes such an admixture of the fresh with the foul air that the latter is rendered innocuous. The fan, moreover, creates a downward current of air, which will be most agreeable to those engaged in the room.

The device may be used to advantage in any close compartment, in halls, theaters, factories, or mines, and it will be of special service in the basement-rooms of stores. It is not necessary, however, that the device should in all cases be near the ceiling. It may, for instance, be supported on a pillar or stand in any part of the room, and may be portable if a flexible connecting-tube communicating with the main air-tube be used for directing the fresh air under pressure to the wheel. The best situation for the wheel will, in fact, depend mainly on the character of the apartment, the position of the doors and windows, and that of the clerks or operatives engaged in the room.

I sometimes secure to each nozzle *a* of the reaction-wheel a short tube, *h*, (shown in Figs. 4 and 5,) which, with the nozzle, forms an ejector, the tendency of the forcible jet from the said nozzle being to induce air to rush through the tube, thereby enhancing the agitating effect of the whirling jets.

Figure 7:
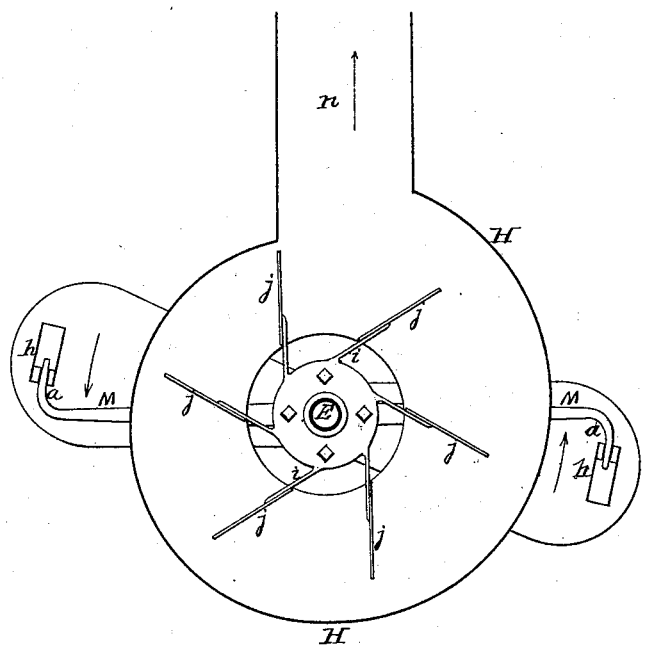

In some cases I combine the reaction-wheel and agitating-fan with an exhaust-fan, as shown in Figs. 6 and 7.

A disk or arms, i, secured to the central hub or casing, D, carry blades j, contained within a casing, H, secured to the under side of the ceiling, and having a central opening, m, and a discharge-pipe, n, the tendency of these blades, as they rotate with the reaction-wheel, being to induce the foul air near the ceiling to pass through the central opening, m, of the casing, whence it is forced through the pipe n to the external atmosphere.

The combination of the reaction-wheel acting under the influence of compressed fresh air with an exhaust-fan and without the agitating-fan will have a beneficial effect in introducing fresh air into a room and exhausting foul air therefrom; but I prefer to combine the reaction-wheel both with the agitating-fan and exhaust-fan.

Air properly heated may during the winter months be discharged in whirling jets into an apartment by the above-described devices.

I claim as my invention—

1. In the art of ventilation, the mode of thoroughly disseminating fresh air as it is introduced into an apartment to be ventilated, and simultaneously effecting the thorough agitation of the foul air in the same—that is to say, introducing the fresh air under pressure and in the form of whirling jets—substantially as herein set forth.

2. The combination of a reaction-wheel driven by compressed air with an exhaust-fan, substantially as described.

3. The combination of a reaction-wheel driven by compressed air with an agitating-fan, substantially as specified.

4. The combination of a reaction-wheel driven by compressed air, an exhaust-fan, and agitating-fan, substantially as specified.

In testimony whereof I have signed my name to this specification in the presence of two subscribing witnesses.

JOHN FERNIE.

Witnesses:
HARRY L. ASHENFELTER,
HARRY SMITH.